Sept. 30, 1958  B. A. BOSHER  2,854,649
VEHICULAR SIGNAL SYSTEM
Filed March 4, 1955  2 Sheets-Sheet 1

INVENTOR
BENJAMIN A. BOSHER

BY *Semmes & Semmes*
ATTORNEYS

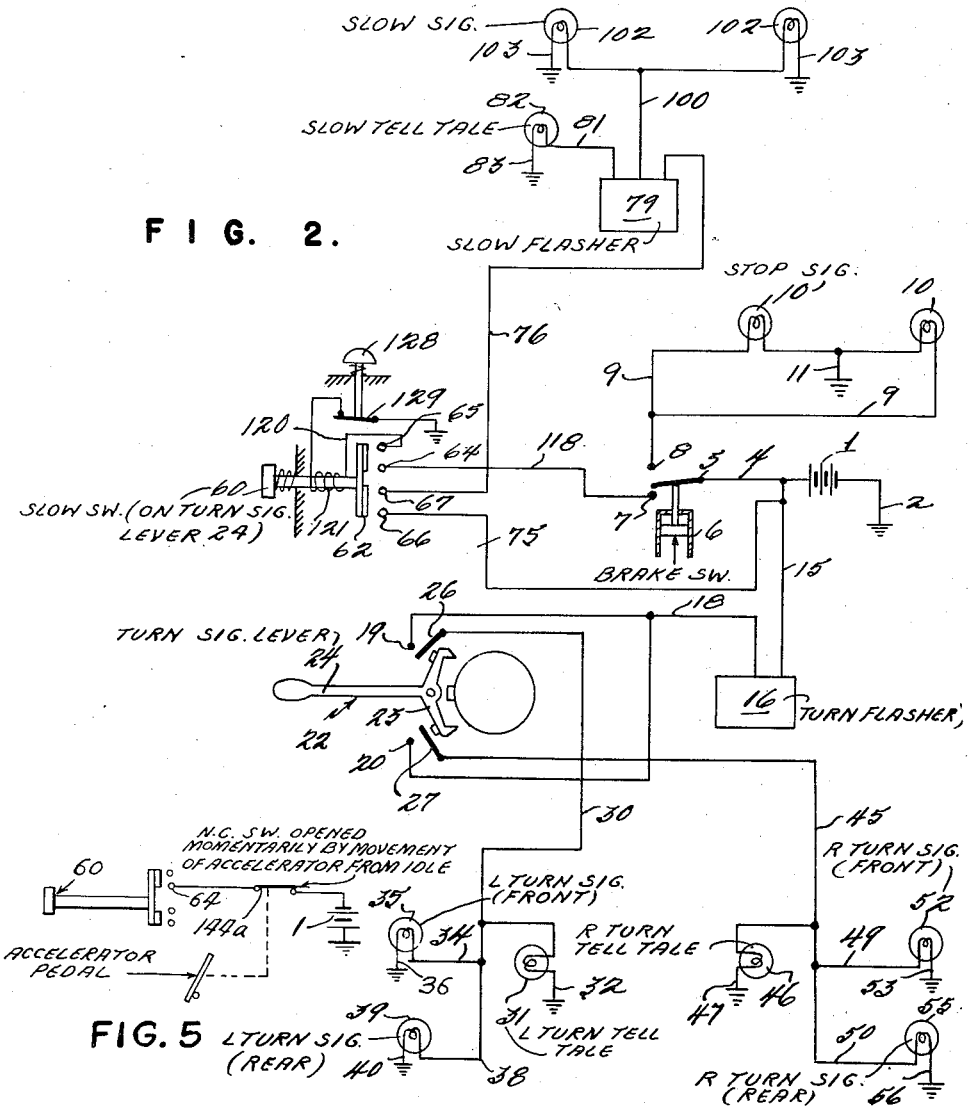

United States Patent Office

2,854,649
Patented Sept. 30, 1958

2,854,649

VEHICULAR SIGNAL SYSTEM

Benjamin A. Bosher, Owings Mills, Md.

Application March 4, 1955, Serial No. 492,143

5 Claims. (Cl. 340—74)

The present invention relates to a vehicular signalling system and more particularly to an auxiliary system intended to implement the usual intelligence transmission systems employed on automobiles.

A primary object of the present invention is to provide in a conventional signalling system for motor vehicles an additional cautionary or alerting circuit whereby the operator's intentions for subsequent movements are communicated to the operators of vehicles in proximity thereto.

A second object of the invention is to provide an auxiliary alerting circuit which is compatible with the conventional signalling system of motor vehicles but which retains its individuality of control.

A further object of my invention is to provide in a signalling system for motor vehicle controllable means for indicating a reduction in vehicular speed or warning of any intention to arrest forward progress of said vehicle.

A still further object of my invention is the provision in a conventional signalling system for motor vehicles of an auxiliary alerting circuit whereby a visual warning of an emergency condition necessitating special attention may be communicated to drivers of approaching vehicles.

Other objects and advantages of the present invention will be readily apparent from the following detailed description of certain preferred embodiments thereof when considered in conjunction with the accompanying drawings, wherein:

Fig. 2 is a schematic diagram of a modified form of signalling system;

Fig. 3 is a schematic diagram of an alternative, automatic system for cancelling an indicated signal;

Fig. 5 is a schematic diagram of still another modified form of signalling system.

Modern automotive vehicles have a lighting system which includes running lamps and signal lamps, the latter being employed to signal stopping or turning of the vehicle.

There has not as yet been provided, however, a caution or warning light by means of which a driver can signal positively an intention to reduce speed before the actual speed reduction. Merely to flash intermittently the stop signals by manipulation of the brake pedal is not sufficient to transmit an intelligible signal to the driver of a following car. Additionally, the braking effect accompanying such manner of signalling might be undesirable at the particular time.

Briefly stated, the present invention contemplates the inclusion in a vehicular signalling system of an auxiliary caution or warning device under complete control of the operator at all times, although automatic cancelling means therefor are provided, whereby his intention to reduce the speed of the vehicle for any purpose may be communicated to persons outside of the vehicle.

Figure 1:
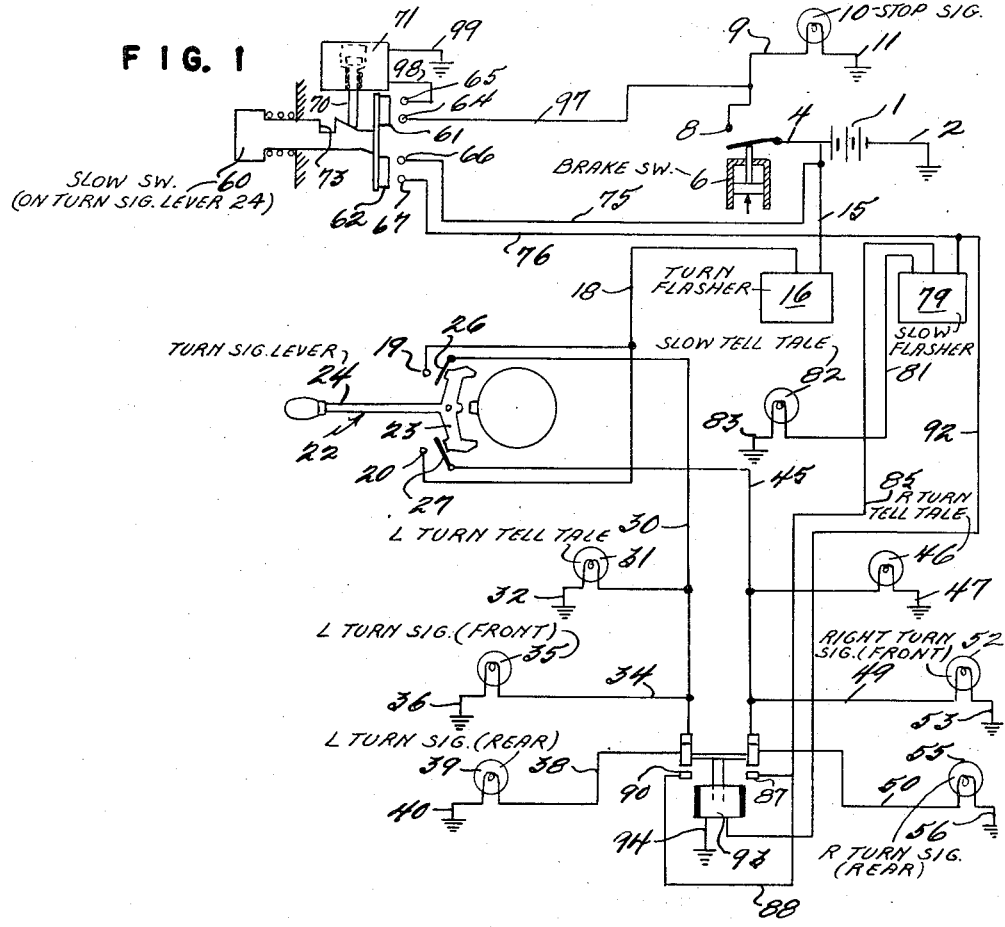
Fig. 1 is a diagrammatic presentation of a signalling system entailing the principles of the invention.

Turning now to the drawings, and particularly to Fig. 1 in which my warning device is illustrated as applied to an ordinary automobile having the usual stop and turn lights, a battery 1, grounded on one side by a line 2 to the body or chassis of the automobile provides a common source of electric energy for the various electrical systems forming a part of the automobile. From the other pole of the battery a line 4 extends to a terminal 5 of a standard brake cylinder pressure switch 6. The other terminal 8 of said switch 6 is connected by a line 9 with a stop lamp 10, grounded at 11. This circuit may and usually does include a second stop lamp (not shown) for dual mounting on the rear fenders of the automobile. The switch 6 ordinarily actuated by pressure within the hydraulic brake system is normally held in the open position, as shown in Fig. 1, and is closed only during the time the automobile brakes are being applied.

A line 15 extends from line 4 to a flasher unit 16 from which a line 18 extends to and connects with spaced terminals 19 and 20 of a directional control switch 22 customarily mounted upon the steering column (not shown) of the automobile. A lever arm 24 extending from the control switch 22 carries a yoke 25 at its inner extremity which alternatively engages and closes spring contacts 26 and 27 upon the terminals 19 and 20, respectively. A line 30 extends from the contact 26 and connects to one side of a tell tale light 31 mounted upon the instrument panel of the car, said light having its opposite side grounded as at 32. An extension 34 of the line 30 leads to one side of a turn light 35, mounted upon the left front fender of the car, and having its opposite side grounded as at 36, while an extension 38 leads to one side of a turn light 39, mounted upon the left rear fender of the car, and having its opposite side grounded as at 40. Similarly a line 45 extends from the contact 27 and connects to one side of a tell tale light 46 mounted upon the instrument panel of the car, said light having its opposite side grounded as at 47. Extensions 49 and 50 of the line 45 lead respectively to a turn light 52, mounted upon the right front fender of the car, and grounded as at 53, and a turn light 55, mounted upon the right rear fender of the car and grounded as at 56.

The auxiliary signalling system of my invention contemplates an arrangement whereby the ordinary operation of the turn or stop lights is modified to indicate some other change in the progress of the vehicle is impending. A master control switch 60 operable manually by the driver is mounted in a location readily accessible to said driver. Preferably the switch 60 is positioned in the head of the lever arm 24. Inward pressure upon the switch 60 brings spaced, independent contact pads 61 and 62 into engagement with paired terminals 64—65 and 66—67 respectively and closes the circuits between said paired terminals. A spring actuated latch 70 which is an extension of the armature rod of solenoid 71 engages a detent 73 in the switch rod to retain said switch in closed position. Suitable guides (not shown) are provided within the body of the switch 60 to prevent undesirable rotation and misalignment of the component parts thereof.

A line 75 extends from the line 15, connected to the battery 1, to the terminal 66, while a line 76 connects the terminal 67 to one side of a flasher unit 79. A line 81 extends from the flasher unit 79 to one side of a tell tale light 82 mounted upon the instrument panel of the car, said light having its opposite side grounded as at 83. A line 85 extends from the flasher unit 79 to a contact 87 while an extension 88 connects the line 85 to a contact 90. An extension 92 connects the line 76 to one side of a solenoid type relay 93, the opposite side of which is grounded as at 94. The relay 93 serves to disconnect the lines 38 and 50 from the lines 30 and 45 respectively and to establish in place thereof connection with the terminals 90 and 87 in order that only the rear turn lights 39 and 55 will be used for transmission of the auxiliary signal although both will be used together.

The signal initiated by operation of the switch 60 continues until movement of the brake pedal closes the switch 6 and energizes the stop light 10. Such action permits a flow of current through a connecting line 97 to the terminals 64—65 and into the solenoid 71, through a line 98, a ground 99 completing the circuit, whereby the latch 70 is retracted permitting the sitch 60 to open and to break the connection between the paired terminals 64—65 and 66—67.

The modification of my invention illustrated in Fig. 2 of the drawings enables the presentation of the desired warning signal with no interference with the normal operation of the turn signals through the use of an independent circuit and separate lights. Closure of the switch 60 completes a circuit through lines 75 and 76 from the battery 1 to the flasher device 79 which activates the tell tale light 82 mounted on the instrument panel of the car. A line 100 connects the flasher 79 to one side of a pair of lights 102 mounted on the rear fenders of the car, the other side of said lights being grounded as at 103. Closure of the switch 60 also completes a circuit through lines 118 and 120 energizing a relay coil 121 serving to retain the switch 60 in closed position. Activation of the car's braking system moves the switch 6 from its open position, wherein the terminal 5 is in operative engagement with a terminal 7 to which line 118 is attached, into its closed position wherein the terminal 5 is brought into operative engagement with the terminal 8 to which lines 9 are attached. Such operation of the switch 6 opens the circuit through which the switch 60 is maintained in closed position as well as the circuit which effects an intermittent flashing of the signal lights 102. In the event, it is desired to open the switch 60 manually, a release button 128 is provided to open a spring switch 129 in the ground line of the relay 121 whereby to break the circuit energizing said relay.

Should it be desired, the automatic release of the auxiliary control switch 60 connected in the circuit illustrated in Fig. 2 may be effected through a modified form of the braking actuated device shown in Fig. 1. This form of my invention is depicted in Fig. 3 of the drawings. Therein a line 140 extends from the terminal 8 of the switch 6 to a relay 141, grounded as at 142. The relay 141 in its normally closed position maintains a spring switch 144 in line 118a extending from the line 4 to the terminal 64 of the control switch 60. Activation of the car's braking system moves the switch 6 into closed position thus energizing the stop light 10 and also the field of the relay 141 to open the switch 144 breaking the circuit through which the switch 60 is maintained in closed position.

Figure 4:
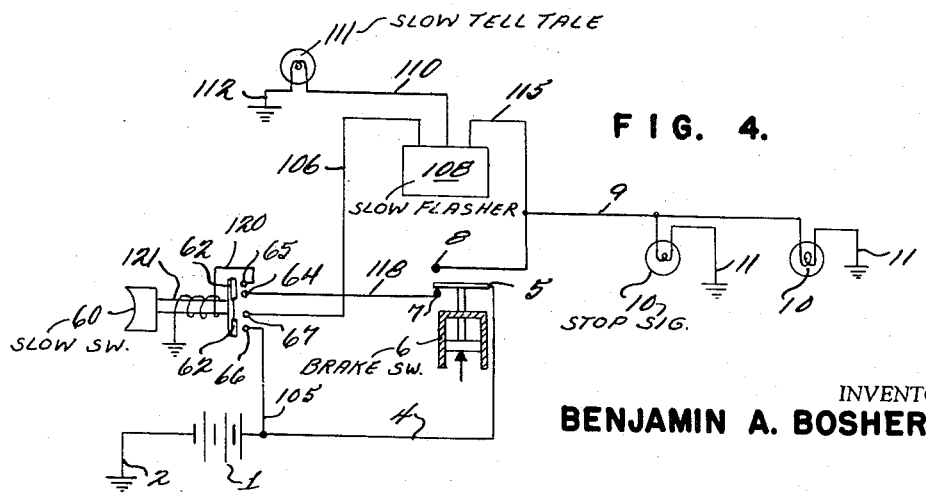
Fig. 4 is a schematic diagram of another modified form of signalling system.

In the modification of my invention illustrated in Fig. 4 of the drawings, there is no interference with the normal operation of the turn signals and instead the auxiliary signal is imposed upon the stop light circuit. Closure of the switch 60 completes a circuit through lines 105 and 106 from the battery 1 to one side of a flasher unit 108. A line 110 connects the flasher 108 to one side of a tell tale lamp 111 mounted upon the instrument panel of the car, the other side of the lamp being grounded as at 112. A line 115 extends from the flasher unit 108 to the line 9 which connects to the stop lights 10, for simultaneous actuation thereof. Closure of the switch 60 also completes a circuit through lines 118 and 120 energizing a relay coil 121 serving to retain the switch 60 in closed position. Activation of the car's braking system moves the switch 6 from its open position, wherein the terminal 5 is in operative engagement with a terminal 7 to which the line 118 is attached, into its closed position wherein the terminal 5 is brought into operative engagement with the terminal 8 to which the line 9 is attached. Such operation of the switch 6 opens the circuit through which the switch 60 is maintained in closed position as well as the circuit, which effects an intermittent flashing of the stop lights 10 and occasions a steady signal illumination of said stop lights 10 which persists so long as the braking switch 6 is closed.

It is also possible for an automatic release of the auxiliary control switch 60 to be accomplished through the use of a switching device coupled to the accelerator rather than the braking system of the vehicle, such device being actuated by a sequence of accelerator movements characteristic to the normal operation of that engine control. As indicated in Fig. 5, the normally closed switch 144a may be secured to the floorboard of the car in close proximity to the actuating rod of the accelerator underlying the foot pedal. Instead of being operated by an electro-magnet, the switch will involve a mechanical trigger arrangement. The trigger is cocked as the accelerator moves toward the idle position, upon release of foot pressure, and preferably during the last portion of such movement. At this time, effective operation of the switch 60 and the "slow" signal control circuit is still permitted for the switch 144 remains closed.

Reapplication of foot pressure against the car's accelerator, moving it away from the idle position, will trip the trigger of the switch 144a, a suitable release mechanism being provided on the accelerator actuating rod for such purpose, and open momentarily the normally closed switch 144a. This will open the "slow" signal control circuit and cancel any signals which may have been imposed thereon by closing of the switch 60. Immediately thereafter, the trigger is returned by suitable spring action to its home position ready to be recocked whenever the accelerator again is moved to the idle position and the switch 144a closes. The tripping of the trigger release is designed to occur at the very beginning of the forward or downward movement of the accelerator in order that the momentary opening of the switch 144a will occur before the slack in the control linkage between carburetor and accelerator is taken up. Accordingly, the switch 144a will remain closed during substantially the entire range of accelerator movement, admitting of actuation of the switch 60 and the "slow" signal control circuit under any driving conditions from idle to full speed.

*Operation*

The various elements are all illustrated in their normal positions. The stop lights 10 may be energized by pressure upon the brake pedal of the car in the usual manner. Also, the turn signal system functions in the customary manner upon movement of its control switch 22, and an automatic cancellation of such signals is effected by movement of the steering wheel as is conventional. When the driver of the car intends to reduce the speed thereof and wishes to communicate his intention to persons outside of the car, he merely closes the switch 60. As has been described, this action may energize separate lamps provided especially for such signal, or may impose a signal upon the conventional turn or stop lights so altered in character that a warning significance is clear. In the latter cases the distinctive manner in which the conventional signal lights are made to operate precludes the possibility of any confusion in distinguishing the signals being transmitted. Furthermore, in these latter modifications no additional lamps and/or housings would be needed for communication of the caution or slow signal and the application of the auxiliary signalling system to used cars is comparatively simple. Where independent caution lights are included in the signalling system, the use of a separate, distinctive color, for example yellow or orange, therefor is contemplate. It is, of course, understood that the usual running lights of the vehicle are in no way affected by the auxiliary signalling system. The possibility of using the same slow signalling circuits as an auxiliary warning device when the vehicle so equipped is temporarily out of service is also contemplated. The distinctive signal resulting from the flashing lights provides a clear indication of an unusual situation warranting instigation of cautionary action on the part of approaching motorists.

Manifestly, various modifications, substitutions and changes in the form and arrangement of the signalling systems herein disclosed may be made without departing from the spirit of the invention or the scope of the appended claims.

What I claim is:

1. In a vehicular lighting system having running lamps and signal lamps and an energization circuit for said lamps including a source of electric potential and switches for connecting said lamps to said source selectively, at least one slow signal lamp mounted at the rear of the vehicle for signalling the intention of the driver to reduce the speed of the vehicle, an additional energization circuit for said slow signal lamp including an independent manually operated switch and said potential source, and additional means responsive to the position of a speed control means for said vehicle for breaking the additional energization circuit for said slow signal lamp, whereby the driver of the vehicle may actuate said independent switch to signal a forewarning intention to reduce the speed of said vehicle, and said signal is cancelled automatically by operation of said speed control means.

2. The system of claim 1, said additional means comprising a switch operated by the vehicle brake pedal.

3. The system of claim 1, said addtional means comprising a switch operated by the vehicle accelerator pedal in moving to increase the vehicle speed.

4. The system of claim 1, said independent switch being of the self-latching type, and said additional means constituting a release for said latch.

5. The system of claim 1, said signal lamps comprising at least a pair of turn signal lamps controlled by turn signal switches selectively, said turn signal switches being operated by a common control lever, said independent switch being mounted on said lever, and said turn signal lamps constituting a pair of said slow signal lamps connected to said independent switch for concurrent energization.

References Cited in the file of this patent

UNITED STATES PATENTS

| | | |
|---|---|---|
| 1,622,932 | Warburton | Mar. 29, 1927 |
| 1,705,135 | Philips | Mar. 12, 1929 |
| 2,225,732 | Bedford | Dec. 24, 1940 |
| 2,269,499 | Wharam | Jan. 13, 1942 |
| 2,321,803 | Falge | June 15, 1943 |
| 2,458,323 | Volker | Jan. 4, 1949 |
| 2,562,271 | Hollins | July 31, 1951 |
| 2,652,553 | Hollins | Sept. 15, 1953 |
| 2,656,426 | Dibelka | Oct. 20, 1953 |
| 2,706,808 | Hollins | Apr. 19, 1955 |
| 2,740,105 | Dorfmann et al. | Mar. 27, 1956 |